(12) United States Patent
Mueller et al.

(10) Patent No.: US 10,243,677 B2
(45) Date of Patent: Mar. 26, 2019

(54) MONITORING THE HIGH-FREQUENCY AMBIENT PARAMETERS BY MEANS OF A WIRELESS NETWORK IN AN AIRCRAFT

(71) Applicant: Airbus Operations GmbH, Hamburg (DE)

(72) Inventors: Jan Mueller, Hamburg (DE); Uwe Schwark, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 253 days.

(21) Appl. No.: 14/268,032

(22) Filed: May 2, 2014

(65) Prior Publication Data

US 2014/0241282 A1 Aug. 28, 2014

Related U.S. Application Data

(63) Continuation of application No. PCT/EP2012/071728, filed on Nov. 2, 2012.
(Continued)

(30) Foreign Application Priority Data

Nov. 4, 2011 (DE) .......................... 10 2011 118 077

(51) Int. Cl.
*H04B 15/00* (2006.01)
*H04B 7/185* (2006.01)

(52) U.S. Cl.
CPC ......... *H04B 15/00* (2013.01); *H04B 7/18506* (2013.01)

(58) Field of Classification Search
CPC ............... H04B 1/3838; H04B 17/345; H04B 7/18506; H04B 17/318; H04W 84/005;
(Continued)

(56) References Cited

U.S. PATENT DOCUMENTS 2,444,452 A * 7/1948 Labin ..................... G01S 7/003
342/60
5,311,183 A * 5/1994 Mathews ............. G01S 13/953
342/26 B
(Continued)

FOREIGN PATENT DOCUMENTS

DE 19704763 8/1998
DE 102008042208 4/2010
(Continued)

OTHER PUBLICATIONS

International Search Report for International Application No. PCT/EP2012/071728 dated Jan. 8, 2013.

*Primary Examiner* — Jung H Park
*Assistant Examiner* — Hoyet H Andrews, III
(74) *Attorney, Agent, or Firm* — Greer, Burns & Crain, Ltd.

(57) ABSTRACT

A network node of a wireless communications network is provided in a means of transportation, for an aircraft, for ascertaining sources of interference, to a system with such a network node, to an associated method for ascertaining sources of interference of a wireless communications network provided in a means of transportation, for the aircraft, and to a computer program for executing the method. The network node includes an interference-power-ascertaining component, for ascertaining an interference power of an interfering radiation emitted from a source of interference, and a transmitting component for wireless or wirebound transmission of the ascertained interference power to a control device for determining at least one of a direction of the interfering radiation and a distance of the source of interference, including the position of the source of interference, on the basis of the ascertained interference power.

20 Claims, 8 Drawing Sheets

Related U.S. Application Data (60) Provisional application No. 61/555,518, filed on Nov. 4, 2011.

(58) Field of Classification Search
CPC . H04W 88/08; H04W 52/243; H04W 52/245; H04W 92/20; H04W 28/18; H04W 48/16; H04W 8/26; H04W 52/267; H04W 74/08; G01R 29/08; G01R 31/008; G01R 31/001
See application file for complete search history.

(56) References Cited

U.S. PATENT DOCUMENTS

| | | | | |
|---|---|---|---|---|
| 5,543,779 | A * | 8/1996 | Aspesi | G01R 23/173 340/539.26 |
| 5,644,229 | A * | 7/1997 | Dossel | G01R 33/0206 324/244 |
| 5,970,395 | A * | 10/1999 | Weiler | G01R 29/08 455/67.13 |
| 6,377,875 | B1 * | 4/2002 | Schwaerzler | B64C 39/024 244/1 R |
| 6,587,078 | B1 * | 7/2003 | Doty | F41G 7/305 244/3.1 |
| 6,760,671 | B1 * | 7/2004 | Batcher | H04B 1/715 702/60 |
| 7,193,558 | B1 * | 3/2007 | Gerlach | G01S 7/295 342/195 |
| 7,349,361 | B1 * | 3/2008 | Allaway | H04B 7/18508 370/316 |
| 2002/0145562 | A1 * | 10/2002 | McLain | H04B 7/18508 342/378 |
| 2003/0153338 | A1 * | 8/2003 | Herz | H04W 4/029 455/517 |
| 2004/0030929 | A1 * | 2/2004 | Bi | G06F 21/10 726/26 |
| 2005/0208935 | A1 * | 9/2005 | Mountney | H04W 16/14 455/422.1 |
| 2007/0038402 | A1 * | 2/2007 | Zhang | H05K 9/00 702/117 |
| 2007/0155329 | A1 * | 7/2007 | Mehrabanzad | H04B 7/18506 455/63.1 |
| 2007/0242621 | A1 * | 10/2007 | Nandagopalan | H04L 12/413 370/254 |
| 2009/0052386 | A1 * | 2/2009 | Higashida | H04H 20/62 370/329 |
| 2009/0166468 | A1 * | 7/2009 | Ryan | G01W 1/08 244/1 A |
| 2009/0318138 | A1 * | 12/2009 | Zeng | H04B 7/18506 455/431 |
| 2010/0014571 | A1 * | 1/2010 | Horton | H04B 7/18506 375/227 |
| 2010/0052923 | A1 * | 3/2010 | He | G08B 21/24 340/635 |
| 2010/0112933 | A1 * | 5/2010 | Mueller | H04B 1/3838 455/1 |
| 2010/0173579 | A1 * | 7/2010 | Spurgat | G11B 27/10 455/3.06 |
| 2010/0262269 | A1 * | 10/2010 | Gladwin | G06F 3/162 700/94 |
| 2010/0279627 | A1 * | 11/2010 | Bradley | H04M 1/72577 455/69 |
| 2011/0065375 | A1 * | 3/2011 | Bradley | H04M 1/72577 455/1 |
| 2011/0207396 | A1 * | 8/2011 | Spurgat | G11B 27/10 455/3.06 |
| 2011/0299470 | A1 | 12/2011 | Muller et al. | |
| 2012/0030361 | A1 * | 2/2012 | Spurgat | H04H 60/88 709/227 |
| 2013/0309987 | A1 * | 11/2013 | VanPatten | H04B 17/29 455/226.2 |

FOREIGN PATENT DOCUMENTS

| | | |
|---|---|---|
| DE | 102009009189 | 8/2010 |
| DE | 102010020536 | 6/2011 |
| WO | 2010092152 | 8/2010 |

* cited by examiner

MONITORING THE HIGH-FREQUENCY AMBIENT PARAMETERS BY MEANS OF A WIRELESS NETWORK IN AN AIRCRAFT

CROSS-REFERENCES TO RELATED APPLICATIONS

The present application is a Continuation application of an International Application No. PCT/EP2012/071728 filed Nov. 2, 2012, which claims priority to a German Patent Application No. 10 2011 118 077.3 filed Nov. 4, 2011 under 35 U.S.C. § 119(a) and 365(b), and a U.S. provisional patent application Ser. No. 61/555,518 filed Nov. 4, 2011 under 35 U.S.C. § 119(e), all of which are incorporated herein by reference.

BACKGROUND OF THE INVENTION

The present invention relates to a network node of a wireless communications network provided in a means of transportation, in particular in an aircraft, for ascertaining sources of interference, to a system with such a network node, to an associated method for ascertaining sources of interference of a wireless communications network provided in a means of transportation, in particular in an aircraft, and also to a computer program for executing the method.

It is intended to employ wireless communications networks increasingly in means of transportation—such as, for example, aircraft, ships, buses or trains—in order to interconnect, or network, electronic devices. These electronic devices (in connection with wireless communications often also designated as electronic terminals) include, inter alia, sensors, indicating elements, such as warning lights and indicator lights, displays (e.g., for so-called in-flight entertainment) and actuators (such as electric motors, lamps and illumination systems). In order to guarantee a reliable transmission of information between the network nodes of the communications network—such as, for example, between the electronic devices themselves or between a central network node and the electronic devices—it is important to take account of interfering influences which may possibly arise.

SUMMARY OF THE INVENTION

It is an object of the present invention to provide a network node as well as a method for ascertaining sources of interference of a wireless communications network provided in a means of transportation, in particular in an aircraft, a system with such a network node, and a computer program for executing the method, by means of which a reliable communication in the wireless communications network is guaranteed.

The network node according to the invention for ascertaining sources of interference of a wireless communications network provided in a means of transportation, in particular in an aircraft, comprises an interference-power-ascertaining component and a transmitting component. The interference-power-ascertaining component is configured to ascertain an interference power of an interfering radiation emitted from a source of interference. The transmitting component is configured to transmit the ascertained interference power to a control device in wireless and/or wire-bound manner for determining a direction of the interfering radiation and/or a distance of the source of interference, in particular the position of the source of interference, on the basis of the ascertained interference power.

The wireless communications network may be any conceivable type of network for wireless networking of electronic devices in a means of transportation, such as in an aircraft, in particular a wireless radio communications network. In the wireless communications network at least some of the network nodes (network elements) communicate with one another in wireless manner, but some of the network nodes may also additionally or alternatively communicate with one another in wire-bound manner. For instance, a network node, such as a central control device, of the communications network may have been connected in wire-bound manner to other network nodes such as so-called data concentrators which, in turn, may communicate in wireless manner with further network nodes such as wireless terminals.

With a view to wireless communication in the communications network, use is preferably made of a firmly predetermined or changeable frequency range or channel, a firmly predetermined or changeable modulation process and a firmly predetermined or changeable channel-coding process. For instance, by way of frequency range the 2.45 GHz ISM band (2400-2500 MHz) may be used. By way of frequency band, the radar altimeter band (4200-4400 MHz), for example, which is utilized for commercial aviation, also enters into consideration. The stated frequency bands are to be understood as being purely exemplary, i.e., the communications network described herein is not restricted to these examples but may also use other frequency ranges. It is further conceivable that different modulation processes come into operation for different applications. For example, single-carrier modulation processes may be used for low-rate applications, and multi-carrier modulation processes for high-rate applications. For the channel coding, block codes and convolutional codes enter into consideration, for example. The stated modulation processes and channel-coding processes are also to be understood as being purely exemplary, i.e., the communications network described herein is not restricted to the use of these examples.

The source of interference may be any conceivable source that is able to influence or interfere with the wireless communications network, in particular a source of electromagnetic interference. The source of interference may be present in the means of transportation itself, such as in the aircraft. However, it may also be located outside the means of transportation, such as the aircraft, and nevertheless influence or interfere with the transmission of information in the communications network. The latter case may occur, for example, when although the source of interference is situated physically outside the means of transportation, such as the aircraft, the interfering radiation emitted from the source of interference is measurable within the means of transportation, such as within the aircraft.

The source of interference may be a faulty network node in the communications network itself, such as a faulty electronic device integrated into the network, or a faulty electronic device that is being carried in the aircraft by a passenger (a so-called passenger electronic device (PED)). Furthermore, the source of interference may also be a faulty electronic device that has not been integrated into the communications network (and that, for example, has nothing at all to do with the network) but nevertheless causes interferences within the frequency range that is being used by the network. Moreover, the device (PED) being carried by a passenger does not necessarily have to be faulty in order to interfere with the communications network. It is also possible, particularly in the case of the utilization of ISM bands that reciprocal interferences (for example, of PEDs and the network) occur, to which the aircraft network can react appropriately as described herein. The source of interference may also be an electronic device or the communications system of another aircraft. In this connection the source of interference may be, for example, components of the wireless communications network of an aircraft located in the vicinity, which is operating within a frequency range that at least overlaps, possibly even coincides with, the frequency range of the communications network. It is also conceivable that the source of interference is an electronic device that is part of the airport infrastructure. Furthermore, devices that generate high-frequency radio noise signals for the purpose of interfering with the communications network (so-called jammers) are also conceivable by way of source of interference.

Irrespective of the precise type of the source of interference, the source of interference may be either stationary with respect to the communications network, for example if it is part of the network, or mobile, for example if it is part of another network. In particular, the source of interference, irrespective of its precise type, is suitable furthermore to emit high-frequency interfering radiation. Since such a source of interference, particularly when it emanates from a locally discrete device or from an antenna, can be assumed as a point source, and the interfering radiation of the point source of interference usually propagates spherically (omnidirectionally) as electromagnetic radiation from the place of installation of the device or of the antenna, the measurable interference power of the interfering radiation decreases with the square of the distance (the range) between the location of the source of interference and the location of the observation.

This is exploited by the proposed network node, in that with the aid of its interference-power-ascertaining component it ascertains the interference power of the interfering radiation at the place where it is located (place of measurement). In particular, the interference-power-ascertaining component can ascertain the level of interference power (the value of the interference power) at its place of installation. From the ascertained interference power at least the direction of the interfering radiation (the direction of the source of interference from the viewpoint of the network node responsible for the measurement) and/or the distance of the source of interference from the network node responsible for the measurement (the range of the network node carrying out the measurement of interference power from the source of interference) may be inferred. According to a further development, from the ascertained interference power the position of the source of interference (the relative position of the source of interference in relation to the network node responsible for the measurement and/or the absolute position of the source of interference in or around the network) may be deduced. For the purpose of determining the direction of the interfering radiation and/or for the purpose of determining the range of the source of interference, or, according to the further development, for the purpose of determining the position of the source of interference, the transmitting component of the network node responsible for the measurement of interference power transmits the ascertained interference power in wireless and/or wire-bound manner to a control device of the communications network. In the control device, by evaluation of the interference power ascertained by the network node and, where appropriate, interference powers ascertained by further network nodes, the direction of the interfering radiation and/or the range of the source of interference (according to the further development, the position of the source of interference) may then be inferred, as will be described below.

The network node may be, for example, any conceivable network element that can be arranged in the communications network and can exchange information with other network nodes of the communications network. According to a first variant, the network node is configured as a wireless terminal of the wireless communications network. By the term 'wireless terminal, in principle any device may be understood that can be integrated into the communications network. For instance, in principle all sensors or actuators conventionally linked up by wire-bound communication can also be integrated in wireless manner into the communications network as wireless terminals or can be linked up to the associated systems (such as wireless data concentrators). As examples of such wireless terminals, temperature sensors, pressure sensors, proximity switches, speed sensors, airflow meters, position-measuring devices, indicating elements, electric motors, lamps and illumination systems may be mentioned.

According to a second variant, the network node is configured as a wireless data concentrator of the wireless communications network, which is in wireless communication with at least one wireless terminal, for example with a plurality of wireless terminals, of the wireless communications network. The wireless data concentrator is preferentially configured in such a way that it is in communication with all the wireless terminals that are located in its coverage zone. Such data concentrators may be arranged at different places in the communications network. With a view to creating redundancy, some data concentrators may be arranged in co-located manner, i.e., at the same place. According to a third variant, the network node is configured neither as a wireless terminal nor as a wireless data concentrator but rather as a network element that is independent of these units. For example, such a network node may be a monitoring device. All the stated variants may be combined with one another, to the extent that not only one network node of one of these variants but rather a plurality of network nodes of several, for example also of all, of these variants may be present in the communications network. Accordingly, it is not only conceivable that either one or more wireless terminals of such a type or one or more data concentrators of such a type are arranged in the communications network, but rather, for example, one or more such terminals and one or more such data concentrators.

It is accordingly conceivable to combine the first, second and third variants at least partly or totally. Accordingly, in the communications network at least some of the wireless terminals and/or at least some of the data concentrators may comprise an interference-power-ascertaining component for ascertaining an interference power of the interfering radiation emitted from the source of interference. Additionally or alternatively, furthermore one or more separate monitoring devices may be integrated into the communications network, which with the interference-power-ascertaining component ascertain the interference power. It is also conceivable that in a plurality (e.g., in all) of the wireless terminals and/or in a plurality (e.g., in all) of the data concentrators an interference-power-ascertaining component for ascertaining the interference power is provided.

Irrespective of the precise configuration of the network node, with the aid thereof the power of the preferentially high-frequency interfering radiation arising or prevailing at the respective location of the network node can be ascertained. The network node may, in particular, be designed or configured for the measurement of the high-frequency interfering radiation within a certain (relevant) frequency range. For example, the network node may have been set or may be set to monitor for interfering radiation a frequency range that at least partly overlaps or totally coincides with the frequency band being used by the communications network. The frequency range monitored by a network node may, however, also be changed, for example depending on which frequency band is being used by the communications network.

If the network node is configured as a wireless terminal or wireless data concentrator, then, for example, at certain time-intervals the interference-power-ascertaining component can ascertain or measure the interference power. Preferentially the interference-power-ascertaining component may ascertain the interference power at the times at which the wireless terminal or the wireless data concentrator is neither transmitting nor receiving. The interference-power-ascertaining component may for this purpose have recourse to the radio transmitters and radio receivers existing in any case in the terminal or data concentrator. Alternatively, in the terminal or data concentrator an additional unit, for example a separate power detector, for measuring the interference power may be provided.

Irrespective of the precise configuration and functions of the network node, the ascertainment of interference power or measurement of interference power may be performed by the interference-power-ascertaining component periodically or in event-based manner. In this way the interference power may be monitored at regular time-intervals or monitored only when the interference-power-ascertaining component is instructed to do this. This instruction may be received by the network node, for example, from the control device which is still to be described more precisely, in particular from a central control device, such as a central network coordinator, of the communications network. Alternatively, the network nodes themselves or other network nodes of the communications network may also trigger or instruct the ascertainment of interference power. For example, a wireless terminal or a monitoring device itself may instruct the ascertainment of the interference power, or the instruction for this may be given by another wireless terminal or monitoring device of the communications network.

Irrespective of the precise configuration and function of the network node ascertaining the interference power, the network node comprises the transmitting component, by means of which the result of measurement (i.e., the ascertained interference power) is transmitted in wireless and/or wire-bound manner to the control device. If the network node is configured, for example, as a data concentrator, the data concentrator preferentially transmits the result of measurement (the ascertained interference power) to the control device in wire-bound manner. If the network node is configured as a wireless terminal, then the transmitting component of the wireless terminal transmits the result of measurement (the ascertained interference power), in particular in wireless manner, to a wireless data concentrator that is assigned to the terminal (in the coverage zone of which the terminal is located), which then passes on the ascertained interference power, for example in wire-bound manner, to the control device. In the case of a monitoring device by way of network node, the transmitting component of the monitoring device transmits, preferentially in wireless manner, the result of measurement (the ascertained interference power) to the data concentrator assigned to said device, which then, in particular in wire-bound manner, passes on the ascertained interference power to the control device.

The system according to the invention for ascertaining sources of interference of a wireless communications network provided in a means of transportation, in particular in an aircraft, comprises at least one network node, such as is being described or has been described herein, and the control device, such as is being described or has been described herein. The control device includes a receiving component, for receiving the interference power transmitted from the transmitting component, and an interference-source-determining component for determining a direction of the interfering radiation and/or for determining a distance of the source of interference on the basis of the interference power (level of interference power) received (obtained) from the transmitting component. In particular, the interference-source-determining component may be configured to determine not only the direction of the interfering radiation and/or the distance of the source of interference but furthermore the position of the source of interference.

The control device may furthermore be configured to take measures to counter the source of interference. For example, the control device may be configured to compare the interference power received from the transmitting component of the network node, i.e., the interference power ascertained by the interference-power-ascertaining component of the network node, with a predetermined threshold. In the event of the threshold being exceeded, the control device may output a warning, such as a warning for the crew of the aircraft, which indicates that a source of interference is located within or in the vicinity of the means of transportation, in particular the aircraft, which is restricting the operation of the wireless communications network. Alternatively or additionally to the warning, the control device may be configured to change one or more transmission parameters of the communications network in the event of the threshold being exceeded. For this purpose, a frequency range or communication channel that is being used in the communications network, a modulation process that is being used in the communications network and/or a channel-coding process that is being used in the communications network may be changed. This means that the respective measures may be executed independently of one another or combined arbitrarily with one another. It is, for example, conceivable to change only the communication channel or the frequency range of the communications network in such a way that the influence exerted by the interference power is diminished, minimized or eliminated. If, for example, prior to the change the frequency range of the communications network and the frequency range of the ascertained interference power have at least overlapped, the frequency range being used by the communications network may, for example, be changed in such a way that there is a smaller overlap or no overlap any longer. Alternatively or additionally, it is possible to exchange the modulation process and/or channel-coding process that is being used in the communications network.

As already stated, the control device may be configured to instruct the interference-power-ascertaining component of the network node to ascertain the interference power of the interfering radiation emitted from the source of interference.

The process according to the invention for ascertaining sources of interference of a wireless communications network provided in a means of transportation, in particular in an aircraft, comprises the following steps: ascertaining an interference power of an interfering radiation emitted from a source of interference, and determining a direction of the interfering radiation and/or a distance of the source of interference on the basis of the ascertained interference power.

For example, the distance (the range) of the source of interference from the network node (e.g., a terminal, data concentrator or monitoring device) executing the process may, by evaluation of the ascertained interference power, be deduced from the fact that the measured interference power decreases with the square of the distance between the network node and the source of interference. If, furthermore, the direction of the incoming interfering radiation is established, then from the direction of the incident interfering radiation and from the distance of the source of interference the position of the source of interference in or around the means of transportation, in particular the aircraft, can be inferred.

The direction of the incoming interfering radiation can be established in various ways. For example, from several measurements at different places (such as at different network nodes) the direction from which the interfering radiation is incident may be ascertained at least by approximation. This procedure works, in particular, when the signal propagation between the source of interference and all measuring nodes (all network nodes carrying out the ascertainment of the direction) obeys similar laws (e.g., in the case of free-field propagation). Alternatively, more complex processes are also conceivable which by means of several receiving antennas and spatial processing methods ascertain the direction of incidence of the interfering radiation.

The interference power may be ascertained periodically at, for example, fixed or changeable time-intervals within the range of milliseconds or seconds. The ascertainment of interference power may be effected, for example, at intervals of about 100 milliseconds. The measuring interval (of, for example, 100 milliseconds) may be fixed or changeable. Accordingly, it is conceivable to change the measuring interval, for example in a manner dependent on the flight phase, by, for example, use being made of shorter intervals between measurements if the aircraft is located on the ground in the vicinity of many disturbing sources or of other aircraft that are operating a similar radio network within the same frequency band. On the other hand, longer intervals between measurements could, for example, be provided if the aircraft is in the so-called cruise phase above a certain minimum altitude. Alternatively, it is also possible that the ascertainment of interference power is executed in event-based manner. For this purpose the control device (e.g., a central control device, such as a central network coordinator) may, for example, instruct the execution of the ascertainment of interference power. The instruction may also be undertaken not by the control device but by network nodes, such as wireless terminals or monitoring devices, themselves. Accordingly, it is conceivable that a network node discovers the basic existence of an interference power and thereupon instructs itself or another network node to ascertain the level of interference power more precisely. The ascertained interference power (the ascertained interference-power level) may then be compared with a predetermined threshold. In the event of the threshold being exceeded, a warning may be output. Additionally or alternatively, one or more transmission parameters of the communications network, such as a frequency range or communication channel being used in the communications network, a modulation process being used in the communications network and/or a channel-coding process being used in the communications network, may be changed.

It is conceivable that not just one source of interference but a plurality of similar or different sources of interference is influencing the communications network. This plurality of sources of interference may be arranged at least partly in or around (e.g., in the vicinity of) the means of transportation, such as the aircraft. In this case, one or more of the network nodes may ascertain a plurality of interference powers of the plurality of interfering radiations emitted from the sources of interference. The ascertained interference powers or interference-power levels may then in each instance be transmitted or forwarded by the one or more network nodes with the aid of their associated transmitting component in wireless and/or wire-bound manner to the control device, such as the central network coordinator. The control device may then evaluate the measured values, which have been obtained, for example, at several places, and infer the directions of the plurality of interfering radiations and/or the ranges of the plurality of sources of interference from the respective network components responsible for the measurement. In particular, the control device may determine the positions of the plurality of sources of interference on the basis of the ascertained interference powers. In this manner it is possible that the control device can draw up the spatial distribution of the sources of interference and of the associated interfering radiations in and around the means of transportation, such as the aircraft.

For example, the control device may also represent, output and evaluate the spatial distribution of the interfering radiation and/or sources of interference pictorially. Furthermore, the control device may create a picture of the interference-power distribution and, in particular, also by observation of this distribution over a certain, predetermined or changeable period, make prognoses about interferences arising in future in parts of the network and, where appropriate, take the countermeasures described above for diminishing or eliminating the interference.

Moreover, the invention relates to a computer program with program-code means, which, when it has been loaded into a computer or a processor (for example, a microprocessor or microcontroller), or is running on a computer or processor (e.g., a microprocessor or microcontroller), causes the computer or processor (e.g., the microprocessor or microcontroller) to execute the process previously described. In addition, the invention relates to a program-storage medium or computer-program product with the stated computer program.

Even if some of the aspects described above have been described in relation to the network components, the control device, or the system, these aspects may also be implemented as methods or as a computer program executing the methods. Equally, aspects described in relation to the method may be realized by suitable units in the network components, in the control device and in the system, or may be executed by the computer program.

The foregoing and other aspects and features of the disclosure will become apparent to those of reasonable skill in the art from the following detailed description, as considered in conjunction with the accompanying drawings.

BRIEF DESCRIPTION OF THE DRAWINGS

Preferred embodiments of the present invention will be elucidated below on the basis of the appended schematic Figures.

DETAILED DESCRIPTION OF THE PREFERRED EMBODIMENTS

In exemplary manner, it will be assumed in the following that the communications networks shown in the Figures are networks of an aircraft. The communications networks are, however, not restricted thereto but may also be arranged in other means of transportation such as trains, buses or ships.

Figure 1:
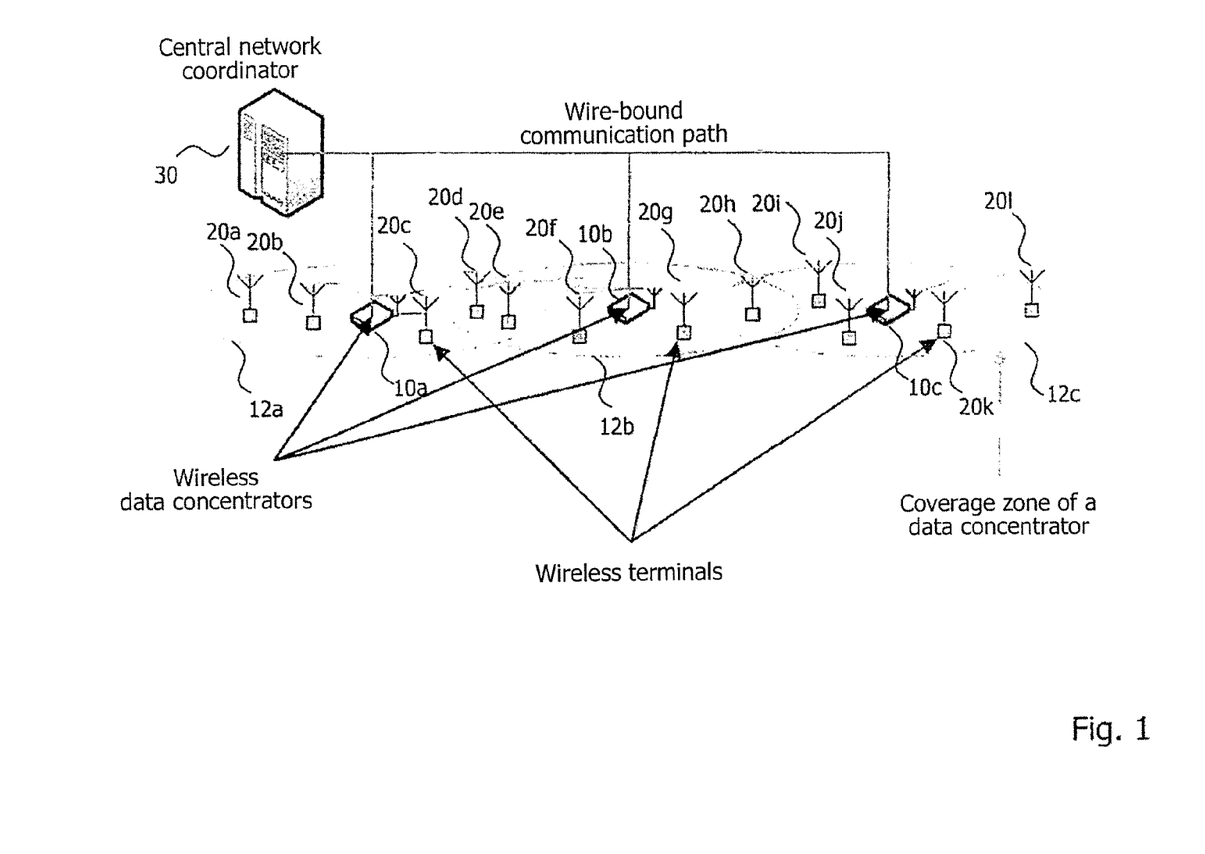
FIG. 1 is a schematic representation of a basic architecture of a wireless communications network for an aircraft.

FIG. 1 shows the basic architecture of a wireless radio communications network for an aircraft.

In the communications network conventional wireless data concentrators, conventional wireless terminals and also a conventional central network coordinator are shown as network nodes of said network. In exemplary manner FIG. 1 shows three conventional wireless data concentrators 10a, 10b, 10c, but any plurality of data concentrators may be arranged in the communications network. Furthermore, FIG. 1 shows in exemplary manner twelve conventional wireless terminals 20a to 20l, but any plurality of wireless terminals may be arranged in the communications network. In addition, according to the example from FIG. 1 a subset of the wireless terminals 20a to 20l has been assigned to each data concentrator 10a, 10b, 10c, i.e., several of the wireless terminals 20a to 20l are located in the coverage zone 12a, 12b, 12c of each data concentrator 10a, 10b, 10c. However, the case may also occur that only one wireless terminal or no wireless terminal is situated in the coverage zone of a data concentrator. The coverage zones of various data concentrators 10a, 10b, 10c may also overlap or even be totally congruent (e.g., in the case of co-located data concentrators for purposes of creating redundancy). Furthermore, by way of control device in FIG. 1 a conventional central network coordinator 30 is shown. Instead of a single central network coordinator 30, however, several network coordinators may also be present in the communications network.

The central network coordinator 30 is connected to each of the wireless data concentrators 10a, 10b, 10c in wire-bound manner. Each of the wireless data concentrators 10a, 10b, 10c is connected in wireless manner to the wireless terminals 20 to 20l located in its coverage zone. For example, in coverage zone 12a of wireless data concentrator 10a there are located wireless terminals 20a, 20b, 20c, 20d, 20e. Furthermore, in coverage zone 12b of wireless data concentrator 10b there are located wireless terminals 20d, 20e, 20f, 20g, 20h. This means that the wireless terminals do not strictly have to be assigned in each instance only to one wireless data concentrator 10a, 10b, 10c but may also be assigned to more than one, such as to a partial number of or to all the data concentrators 10a, 10b, 10c. In FIG. 1 in exemplary manner wireless terminal 20h is assigned both to wireless data concentrator 10b and to wireless data concentrator 10c.

The central network coordinator 30 may, for example, instruct wireless data concentrator 10a with the aid of an instruction signal to instruct a particular wireless terminal or a subset or all of the wireless terminals 20a to 20e that are present in its coverage zone 12a to execute particular functions by virtue of the instruction signal. To be mentioned as being exemplary of such functions are the provision of light, the triggering of the oxygen system, the provision of particular audio or video information, or other functions that are capable of being executed by a wireless terminal in the aircraft. In principle, all sensors or actuators linked up by wire-bound communication can also be linked up in wireless manner to the respective associated system(s) or integrated into the wireless communications network. By way of further functions defined by the instruction signal, in exemplary manner functions to be performed by temperature sensors, pressure sensors, proximity switches, speed sensors, airflow meters, position-measuring devices etc. may be mentioned.

Figure 2:
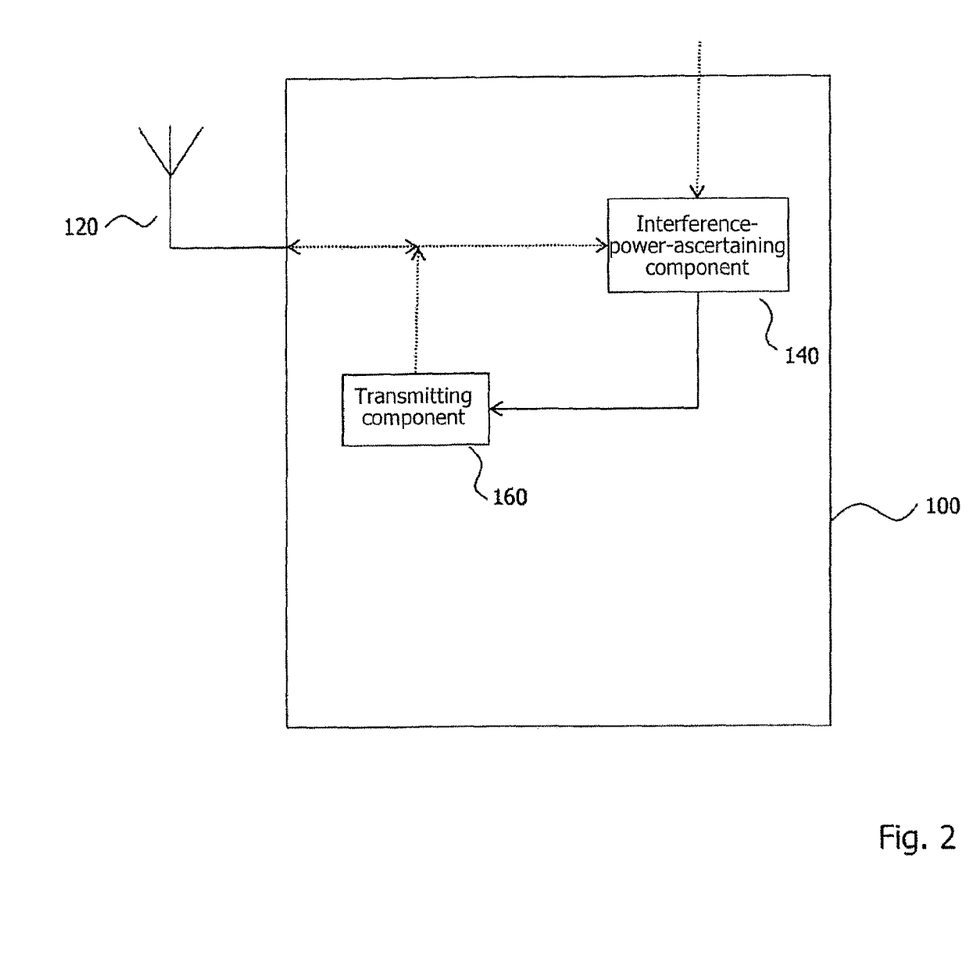
FIG. 2 is a schematic representation of an embodiment of a wireless data concentrator.

FIG. 2 shows schematically an embodiment of a wireless data concentrator 100 that is capable of being employed as network node of the communications network of an aircraft and may replace one or more of the data concentrators 10a, 10b, 10c shown in FIG. 1. The wireless data concentrator 100 comprises an antenna 120, an interference-power-ascertaining component 140 and a transmitting component 160. In exemplary manner the antenna 120 is configured in FIG. 2 as a transmitting and receiving antenna which can both transmit and receive data. However, this is only to be understood as being exemplary, and instead of the transmitting/receiving antenna 120 one or more transmitting antennas and one or more receiving antennas may also be arranged on the wireless data concentrator 100. The information received by the antenna 120 can then be processed by the interference-power-ascertaining component 140 and relayed to the transmitting component 160. Furthermore, as indicated schematically in FIG. 2, the interference-power-ascertaining component 140 may also receive data, in wire-bound manner, from the central network coordinator. The precise mode of operation of the wireless data concentrator 100 will be described more precisely below with reference to FIGS. 4 to 8.

Figure 3:
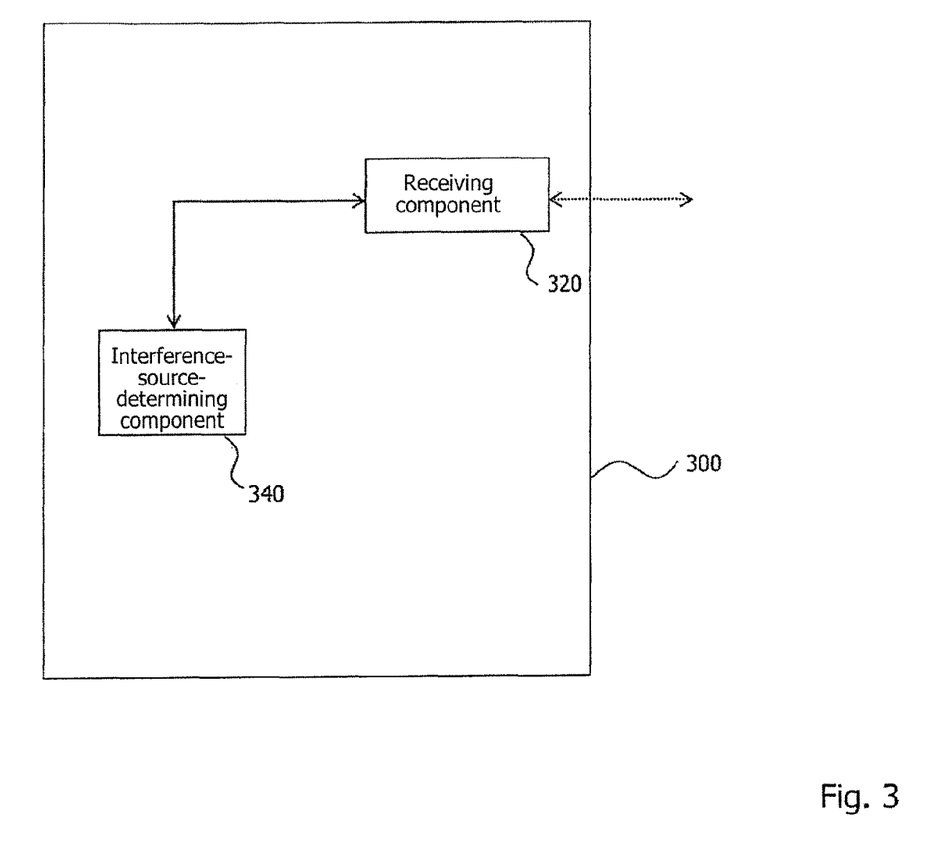
FIG. 3 is a schematic representation of an embodiment of a central network coordinator.

FIG. 3 shows schematically an embodiment of a central network coordinator 300 that is capable of being employed as control device of the communications network and may replace the network coordinator 30 shown in FIG. 1. The central network coordinator 300 comprises a receiving component 320 and an interference-source-determining component 340. The receiving component 320 is connected in wire-bound manner, as represented schematically with reference to FIG. 1 with regard to the conventional architecture, to the data concentrators of the communications network, irrespective of whether it is a question of conventional data concentrators 10a, 10b, 10c or of data concentrators 100 according to the embodiment. With the aid of the receiving component 320 the central network coordinator 300 can receive the information transmitted from the data concentrator 100. The interference-source-determining component 340 can obtain this information from the receiving component 320 and process it, in order to determine information about interfering radiation and/or sources of interference that is/are present in the network, as will be elucidated further below with reference to FIGS. 4 to 8.

Figure 4:
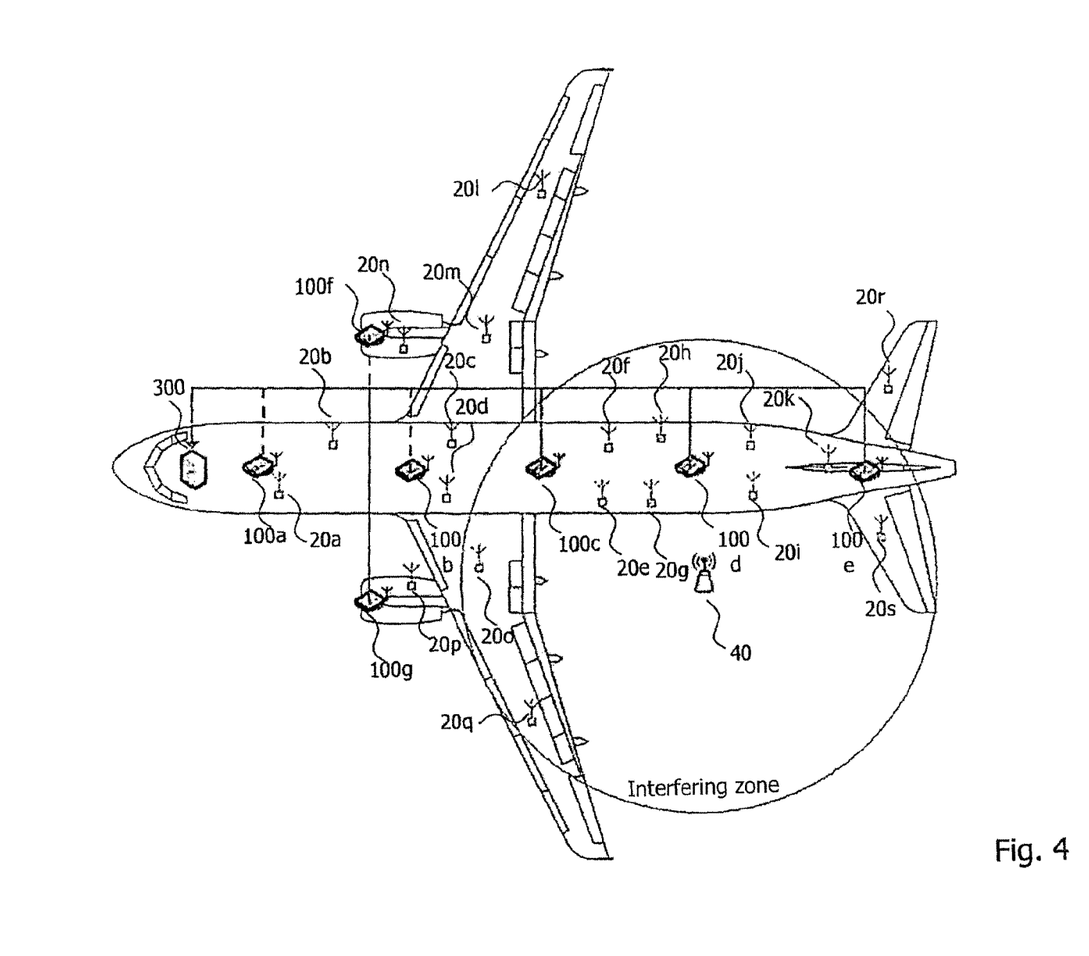
FIG. 4 is a schematic representation of a system for ascertaining sources of interference according to a first embodiment.

FIG. 4 shows a system for ascertaining sources of interference according to a first embodiment, in which use is made only of data concentrators 100 according to the embodiment shown in FIG. 2. Alternatively, however, one or more of the data concentrators may also be configured as conventional data concentrators 10a, 10b, 10c. Furthermore, by way of network coordinator use is made of the network coordinator according to the embodiment shown in FIG. 3. The communications network from FIG. 4 shows, in exemplary manner as network nodes of the communications network, seven data concentrators 100a to 100g, nineteen conventional wireless terminals 20a to 20s, and a central network coordinator 300. Furthermore, a source of interference 40 and the spherical interfering zone thereof are shown in FIG. 4. The terminals 20a to 20s are conventional terminals which come into operation in an aircraft and such as are also shown in FIG. 1. The data concentrators 100a to 100g and the central network coordinator 300, on the other hand, are not ordinary data concentrators 10 or an ordinary central network coordinator 30 respectively, as shown in FIG. 1. The data concentrators 100a to 100g shown in FIG. 4 are configured just like the data concentrator 100 shown in FIG. 2. Similarly, the central network coordinator 300 which is present in FIG. 4 is configured just like the network coordinator 300 shown in FIG. 3.

The mode of operation of the system formed in this manner will be elucidated below.

In the system shown in FIG. 4, merely the wireless data concentrators (not the wireless terminals) ascertain within the radio communications network the interference-power level of the interfering radiation emitted from the source of interference 40 at their respective places of installation with the aid of their interference-power-ascertaining components 140, and communicate the ascertained levels in wire-bound manner to the central network coordinator 300. Furthermore, in the example from FIG. 4 only the data concentrators 100c, 100d, 100e that are actually registering or have registered interferences ascertain the level of the interfering radiation with the aid of their ascertaining component 140. The other data concentrators 100a, 100b, 100f, 100g, at which no interference power is present within the measurable range, also do not attempt to measure the interference-power level. This means that, in the exemplary case shown, it is possible to speak of event-based registration of interference, since only the data concentrators in which interfering radiation is actually measurable measure the interference-power level arising at their place of installation. Alternatively, however, it is also conceivable that all the data concentrators 100a to 100g which are shown attempt to register interferences, for example periodically, whereby, in the exemplary case shown, data concentrators 100a, 100b, 100f, 100g do not register interferences, since they are not situated in the interfering zone of the source of interference 40, which according to the Figures is spherical. On the other hand, only data concentrators 100c, 100d, 100e register an interfering radiation and ascertain, with the aid of their interference-power-ascertaining component 140, the level of the registered interfering radiation. The ascertained interference-power levels are then in each instance transmitted from the corresponding transmitting component 160 of data concentrators 100c, 100d, 100e in wire-bound manner to the central network coordinator 300. In addition to the interference-power level, each data concentrator is able to transmit information, on the basis of which the network coordinator 300 is able to recognize the data concentrator from which the data originate. Alternatively, the network coordinator 300 can also itself ascertain, on the basis of the transmitted data, the data concentrator from which the data originate.

The receiving component 320 of the network coordinator 300 receives the information from the corresponding data concentrators 100c, 100d, 100e and forwards the data to the interference-source determining component 340. In the interference-source-determining component 340 the network coordinator 300 evaluates the interference-power levels of data concentrators 100c, 100d, 100e and infers from the interference-power levels the direction and/or the range (the distance) of the respective data concentrators 100c, 100d, 100e with respect to the source of interference 40. In addition to the direction and/or the range of the source of interference, the network coordinator 300 can determine the position of the source of interference 40. In the example from FIG. 4 which is shown, data concentrator 100d ascertains, on the basis of its least range from the source of interference 40, the highest interference-power level. Data concentrators 100c, 100e ascertain, on the basis of their similar range from the source of interference 40, in each instance an at least practically equally high interference-power level, which, however, is lower than the interference-power level ascertained by data concentrator 100d. This is due to the fact that the interference power emitted from the source of interference 40 to be assumed as being a point source decreases with the square of the distance from the source of interference 40. Data concentrators 100c, 100d, 100e forward the interference-power levels ascertained by them to the network coordinator 300 which then evaluates the interference-power levels. Accordingly, the determining component 340 can infer the position of the source of interference 40 from the information about the interference-power levels and from the information about data concentrators 100c, 100d, 100e, for example about the positions of data concentrators 100c, 100d, 100e, and, for example, can ascertain that the source of interference 40 is located outside the aircraft (and at which place outside the aircraft it is at least nearly located).

With the system shown in FIG. 4 for ascertaining sources of interference, sources of electromagnetic interference 40 can be discovered without energy for the gauging of the electromagnetic interfering environment being needed in the terminals. This is an advantage, in particular, in the case of terminals that are self-sufficient in terms of energy, which, for example, are supplied by batteries or energy-harvesters (derived from the term 'energy harvesting': generation of power from sources such as ambient temperature, vibration or airflows).

Figure 5:
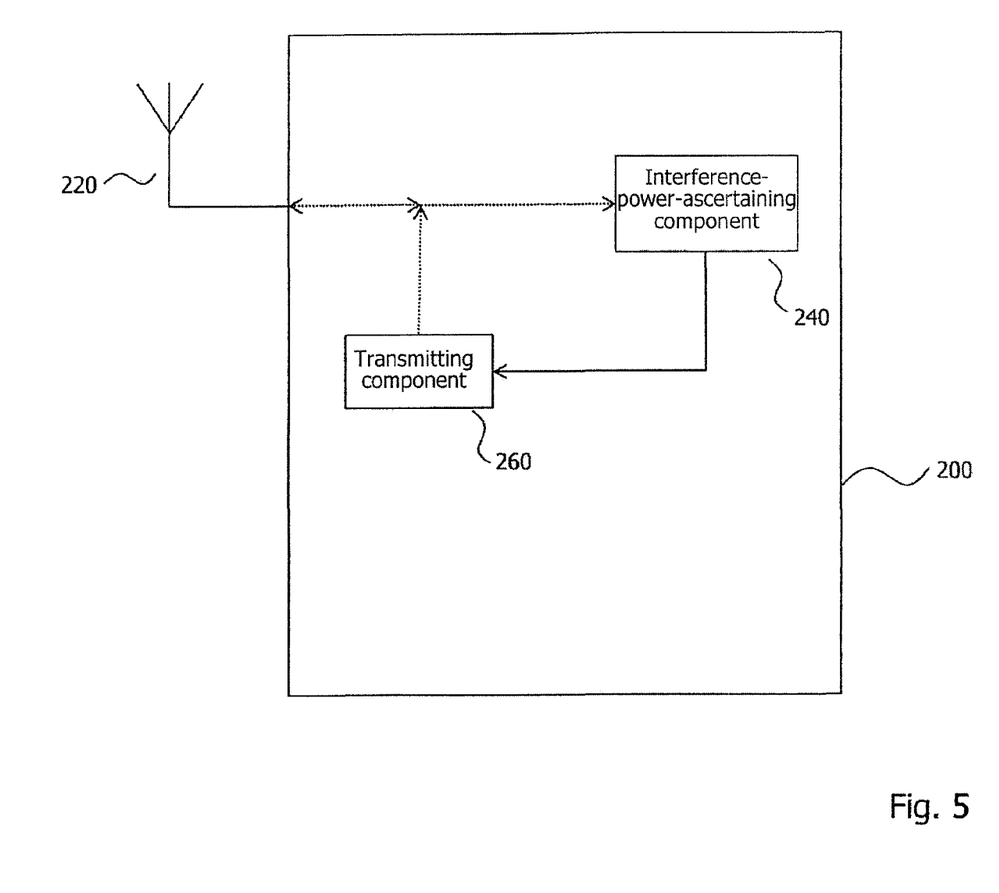
FIG. 5 is a schematic representation of an embodiment of a wireless terminal.

FIG. 5 shows an embodiment of a wireless terminal 200. The wireless terminal 200 comprises an interference-power-ascertaining component 240 and a transmitting component 260, which are configured just like the interference-power-ascertaining component 140 and the transmitting component 160 of the data concentrator 100 from FIG. 2. Furthermore, the antenna 220 of the terminal 200 corresponds to the antenna 120 of the data concentrator 100. The mode of operation of the wireless terminal 200 shown in FIG. 5 will now be elucidated further with reference to FIG. 6.

Figure 6:
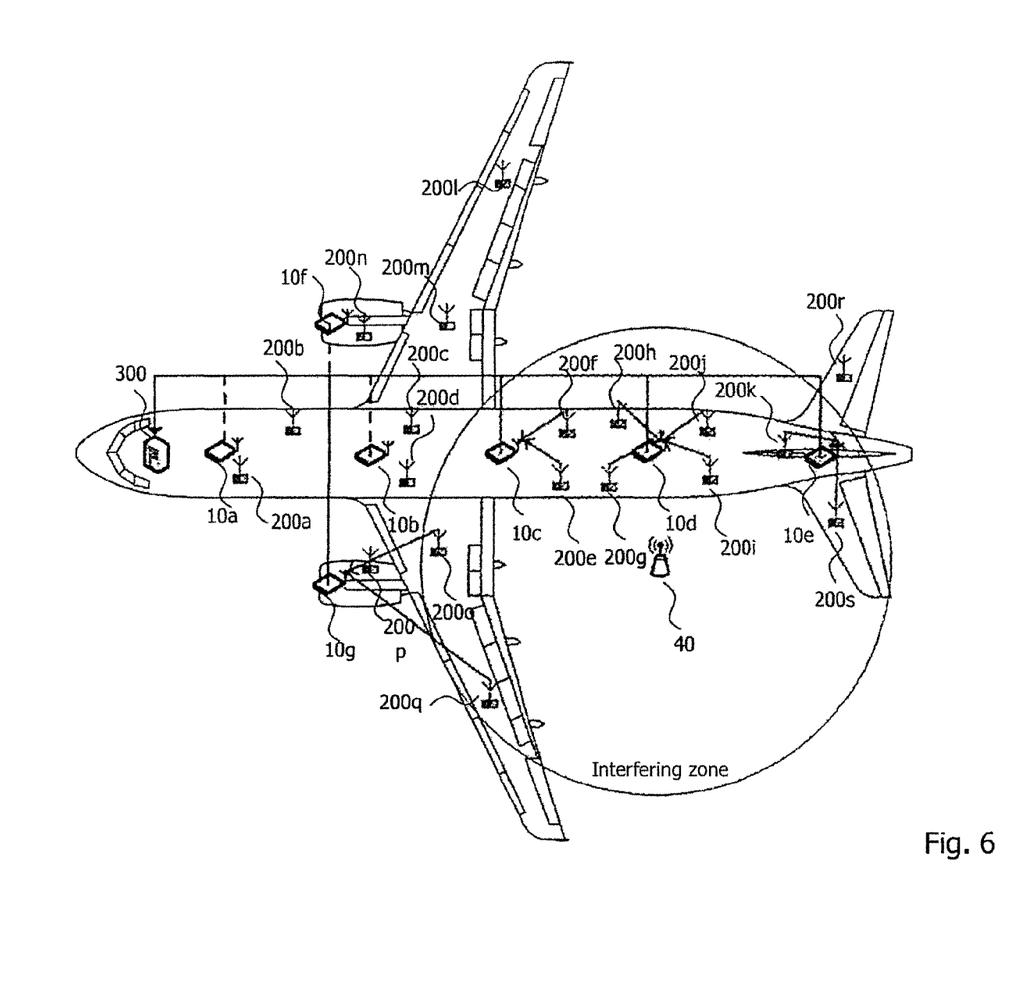
FIG. 6 is a schematic representation of a system for ascertaining sources of interference according to a second embodiment.

Similarly to FIG. 4, FIG. 6 shows a radio communications network with data concentrators, with terminals and with a network coordinator. Similarly as in FIG. 4, the network coordinator is the network coordinator 300 from FIG. 3. In contrast to FIG. 4, in the network from FIG. 6 the data concentrators 10a to 10g are conventional data concentrators, and the wireless terminals are wireless terminals 200 which correspond to that from FIG. 5. Consequently the wireless terminals 200a to 200s are equipped with an interference-power-ascertaining component 240, but the data concentrators 10a to 10g are not.

In the example shown in FIG. 6 merely the wireless terminals 200a to 200s which are within the radio communications network ascertain the interference-power level at their respective places of installation. According to FIG. 6, wireless terminals 200e, 200f, 200g, 200h, 200i, 200j, 200k, 200o, 200q, 200s ascertain an interference-power level of the interfering radiation, whereby in the case of the remaining wireless terminals no interfering radiation is measurable any longer or no appreciable interfering radiation is measurable any longer. Alternatively, however, it is also conceivable that all the terminals attempt to detect an interfering radiation, irrespective of whether or not interfering radiation is actually measurable at their places of installation. After the measurement has taken place, the wireless terminals 200e, 200f, 200g, 200h, 200i, 200j, 200k, 200o, 200q, 200s forward the measured interference-power level by radio (in wireless manner) to their respectively associated data concentrator, i.e., according to FIG. 6 data concentrators 10c, 10d, 10e, 10g, which thereupon forward all the interference-power levels communicated to them to the central network coordinator 300 by wire-bound transmission. The central network coordinator 300 can then, in like manner as described with reference to FIG. 4, evaluate the interference-power levels ascertained by the respective wireless terminals and, taking account of which wireless terminals have detected the interference-power levels at their places of installation, can draw conclusions therefrom as to the directions and ranges and hence the position of the source of interference 40.

According to FIG. 6, in exemplary manner only those data concentrators 10c, 10d, 10e, 10g, in the coverage zone of which interferences have been detected (reported) by terminals, forward measured values to the central network coordinator 300, so that it is possible to speak of event-based registration of interference. Alternatively, however, all the data concentrators may forward the measured values communicated to them by the associated terminals (even if they are equal to zero) periodically to the network coordinator 300.

With the aid of the communications network and system shown in FIG. 6, sources of electromagnetic interference 40 can be detected within wide zones of the network.

Figure 7:
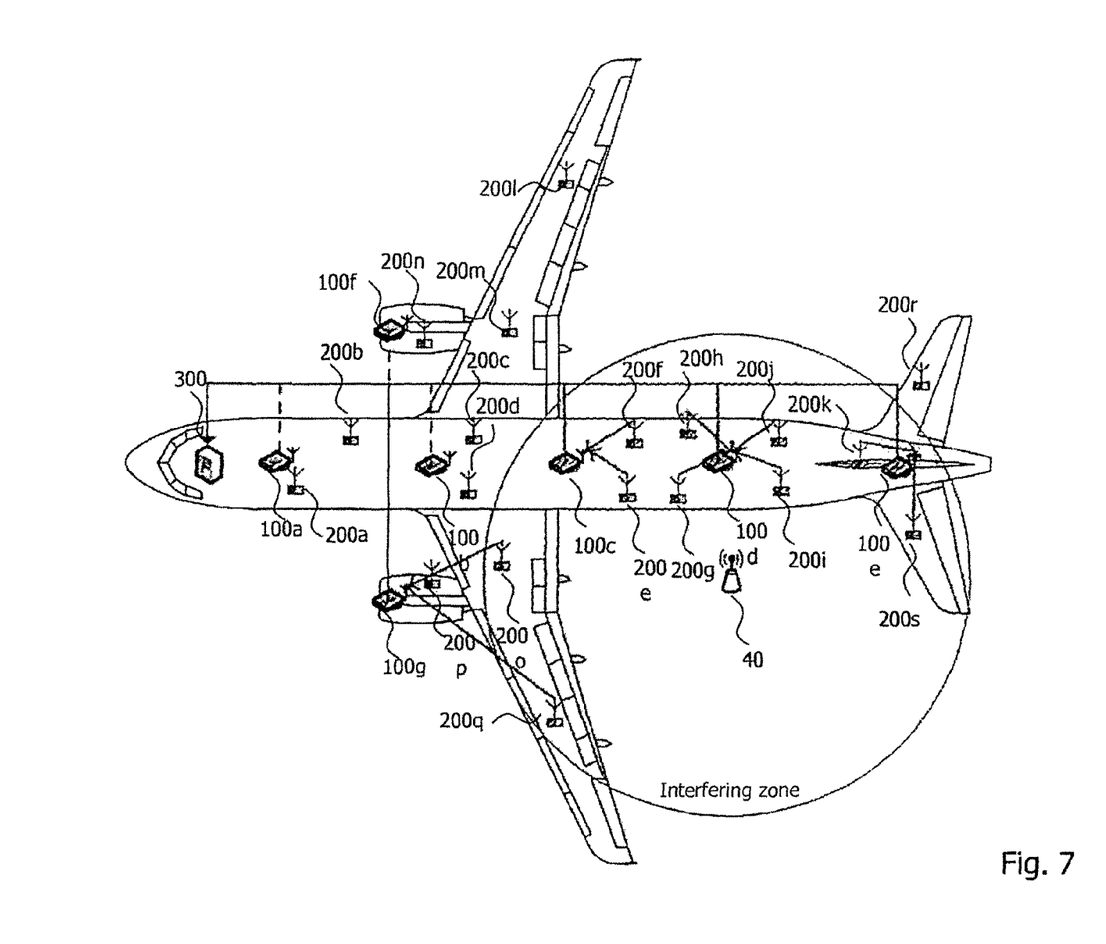
FIG. 7 is a schematic representation of a system for ascertaining sources of interference according to a third embodiment.

FIG. 7 shows a system for detecting sources of interference in a communications network according to a third embodiment. The system according to the third embodiment combines the system according to the first embodiment from FIG. 4 with the system according to the second embodiment from FIG. 6. This means that, in the system according to the third embodiment, by way of network nodes both the wireless terminals and the wireless data concentrators are at least partly equipped with an interference-power-ascertaining component 140, 240. In FIG. 7 all the wireless terminals 200a to 200s are equipped, like the terminal 200 shown in FIG. 5, with an interference-power-ascertaining component 240, and all the wireless data concentrators 100a to 100g are equipped, like the data concentrator 100 shown in FIG. 2, with an interference-power-ascertaining component 140. This has the consequence that the electromagnetic interfering environment is detected both by the wireless terminals and by the wireless data concentrators, an interference-power level is ascertained in each instance both by the data concentrators and by the terminals, and all measured interference-power levels are communicated to the central network coordinator 300. This has the consequence that a detection of sources of electromagnetic interference 40 is possible within the entire coverage zone of the radio communications network.

Figure 8:
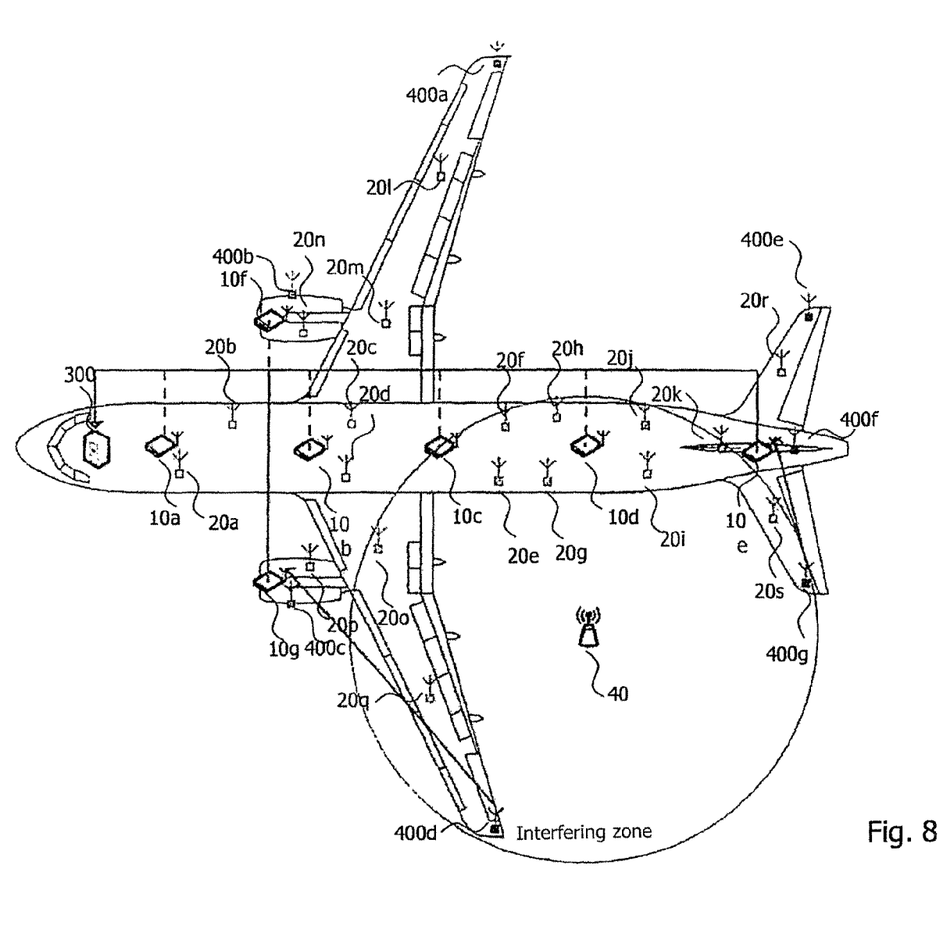
FIG. 8 is a schematic representation of a system for ascertaining sources of interference according to a fourth embodiment.

FIG. 8 shows a system according to a fourth embodiment for ascertaining sources of interference of a communications network. The communications network comprises at least partly—in the example shown, exclusively—conventional wireless data concentrators 10a to 10g and conventional wireless terminals 20a to 20s, such as have been described with reference to FIG. 1. Furthermore, the network comprises a central network coordinator 300 such as has been described with reference to FIG. 3. Additionally, wireless monitoring devices 400a to 400g are present as network nodes, which do not represent terminals but serve only for the monitoring of sources of interference and otherwise perform no further function. The special monitoring devices 400a to 400g, which, as can be seen in FIG. 8, are fitted in exemplary manner to the extremities of the aircraft structure (e.g., to the wing tips, engine cowlings, outer edges of the vertical and horizontal tail surfaces, landing-gear etc.), ascertain the interference-power level at their respective places of installation and communicate said level by wireless communication to their respective wireless data concentrator 10a to 10e. The latter forward the received measured values, in turn, to the central network coordinator 300 in wire-bound manner. The monitoring devices 400a to 400g may, in principle, be constructed like the embodiment of the terminal 200 shown in FIG. 5, i.e., they may comprise an antenna 220, an interference-power-ascertaining component 240 and a transmitting component 260.

By virtue of the low complexity of the monitoring nodes (monitoring devices), these can be installed at favorable cost also in places where neither a terminal nor a data concentrator is usually necessary. An installation at the outermost extremities, possibly also outside the coverage zone of the radio communications network, enables an early detection of interferences 40 before the communication in the network is impaired, and an appropriate proactive action of the central network coordinator 300.

It is also possible to combine the systems described with reference to FIGS. 4, 6, 7 and 8 suitably with one another. It is also possible in each instance to equip only some of the network nodes (e.g., only some of the wireless terminals or data concentrators) with the measuring function. For example, the measuring function can be dispensed with in the case of network nodes (network devices) that have been installed in a closed space or in a space that is well shielded from electromagnetic radiation. In all the embodiments that have been described, the ascertaining of the electromagnetic interfering environment may be effected in event-based manner (e.g., when a defined interference-power level has been exceeded) or in periodically recurring manner. By virtue of the locally distributed detection of measured values within the entire coverage zone of the network, the central network coordinator 300 may create an image of the interference-power distribution and, by observation of this distribution over a certain period, may also make prognoses about interferences occurring in future in parts of the network, and react in appropriate manner. For example, the network coordinator 300 may instruct that transmission parameters of the radio communications system—such as the frequency range or channel, the modulation process or the channel-coding process—be changed.

While preferred embodiments of the disclosure have been herein illustrated and described, it is to be appreciated that certain changes, rearrangements and modifications may be made therein without departing from the scope of the disclosure.

The invention claimed is:

1. A network node for ascertaining sources of interference of a wireless communications network provided in a means of transportation, for an aircraft, the network node comprising:

an interference-power-ascertaining component for determining a time interval based on a flight phase and periodically ascertaining, at the determined time interval, an interference power of an interfering radiation emitted from a source of interference; and a transmitting component for at least one of wireless and wire-bound transmission of an ascertained interference power to a control device for determining at least one of:

a direction of the interfering radiation and a distance of the source of interference, including the position of the source of interference, based on the ascertained interference power;

wherein the network node is configured to detect existence of interference; and wherein, when the existence of interference is detected, the network node instructs itself or another network node to ascertain a level of interference power quantitatively.

2. The network node according to claim 1, wherein the network node is configured as at least one of:

a wireless terminal of the wireless communications network and a wireless data concentrator of the wireless communications network, which is in wireless communication with at least one wireless terminal of the wireless communications network.

3. The network node according to claim 1, wherein the network node is located at an outermost extremity of the aircraft.

4. The network node according to claim 1, wherein the network node is configured to detect whether the source of interference is within or in the vicinity of the aircraft.

5. The network node according to claim 1, wherein the determined time interval when the aircraft is in flight is shorter than the determined time interval when the aircraft is on the ground.

6. A system for ascertaining sources of interference of a wireless communications network provided in a means of transportation, for an aircraft, the system comprising:

at least one network node for ascertaining sources of interference of a wireless communications network provided in a means of transportation, for an aircraft, the network node including:

an interference-power-ascertaining component for determining a time interval based on a flight phase and periodically ascertaining, at the determined time interval, an interference power of an interfering radiation emitted from a source of interference; and a transmitting component for at least one of wireless and wire-bound transmission of an ascertained interference power to a control device for determining at least one of:

a direction of the interfering radiation and a distance of the source of interference, including the position of the source of interference, based on the ascertained interference power; and a control device, the control device comprising a receiving component, for receiving the interference power transmitted from the transmitting component, and an interference-source-determining component for determining at least one of a direction of the interfering radiation and a distance of the source of interference, including the position of the source of interference, on the basis of the received interference power;

wherein the interference-power-ascertaining component is located outside a coverage zone of the wireless communications network.

7. The system according to claim 6, wherein the control device is further configured to compare the received interference power with a predetermined threshold and in the event of the threshold being exceeded to at least one of:

output a warning and change one or more transmission parameters of the communications network.

8. The system according to claim 7, wherein the control device is configured to change the one or more transmission parameters in such a manner that at least one of:

a frequency range or communication channel being used in the communications network, a modulation process being used in the communications network and a channel-coding process being used in the communications network is changed.

9. The system according to claim 6, wherein the control device is further configured to instruct the interference-power-ascertaining component to ascertain the interference power of the interfering radiation emitted from the source of interference.

10. The system according to claim 6, wherein the control device is further configured to instruct the at least one network node not to ascertain the interference power of the interfering radiation when no interference power is present within a measurable range.

11. The system according to claim 6, wherein, when the at least one network node ascertains the source of interference, the at least one network node instructs a further at least one network node to ascertain a power level of the source of interference.

12. The system according to claim 6, wherein the control device is further configured to take an action to address the source of interference before the network node is impaired by the source of interference.

13. The system according to claim 6, wherein the control device is further configured to change the determined time interval dependent on a presence of numerous sources of interference.

14. A method for ascertaining sources of interference of a wireless communications network provided in a means of transportation, for an aircraft, the process comprising the following steps:

determining a time interval based on a flight phase;

periodically ascertaining, the determined time interval, an interference power of an interfering radiation emitted from a source of interference; and determining at least one of:

a direction of the interfering radiation and a distance of the source of interference on the basis of the ascertained interference power; and wherein existence of interference is detected; and when the existence of interference is detected, a level of interference power is quantitatively ascertained.

15. The method according to claim 14, wherein the process further comprises the determining of the position of the source of interference on the basis of at least one of the ascertained direction and the ascertained distance.

16. The method according to claim 14, wherein the ascertained interference power is compared with a predetermined limiting value and in the event of the limiting value being exceeded at least one of:

a warning is output and one or more transmission parameters of the communications network is changed.

17. The method according to claim 16, wherein the step of changing the one or more transmission parameters comprises at least one of:

the changing of at least one of a frequency range and a communication channel being used in the communications network, the changing of a modulation process being used in the communications network, and the changing of a channel-coding process being used in the communications network.

18. The method according to claim 14, wherein if a plurality of interfering radiations are emitted from a plurality of sources of interference, a plurality of interference powers of the plurality of emitted interfering radiations are ascertained, and at least one of:

the directions of the plurality of interfering radiations and the ranges of the plurality of sources of interference, including the positions of the plurality of sources of interference, is determined on the basis of the ascertained interference powers.

19. The method according to claim 18, wherein from the plurality of interference powers, the spatial distribution of the plurality of interfering radiations is ascertained.

20. A non-transitory program-storage medium having computer executable instructions, the instructions being loaded onto and running on a computer or a processor, causing the computer or processor to execute the instructions for ascertaining sources of interference of a wireless communications network provided in a means of transportation, for an aircraft, comprising the instructions to:

determine a time interval based on a flight phase;

periodically ascertain, at the determined time interval, an interference power of an interfering radiation emitted from a source of interference; and determine at least one of:

a direction of the interfering radiation and a distance of the source of interference on the basis of the ascertained interference power;

wherein existence of interference is detected; and when the existence of interference is detected, a level of interference power is quantitatively ascertained.

* * * * *